(12) United States Patent
Martin et al.

(10) Patent No.: US 8,655,298 B2
(45) Date of Patent: Feb. 18, 2014

(54) METHOD AND SYSTEM FOR LOCATING INTERFERENCES BY FREQUENCY SUB-BAND

(71) Applicant: Thales, Neuilly-sur-Seine (FR)

(72) Inventors: Nicolas Martin, Bourg les Valence (FR); Franck Leteshi, Bourg-de-Peage (FR); Bruno Montagne, Saint-Barthelemy de Vals (FR)

(73) Assignee: Thales, Neuilly-sur-Seine (FR)

( * ) Notice: Subject to any disclaimer, the term of this patent is extended or adjusted under 35 U.S.C. 154(b) by 0 days.

(21) Appl. No.: 13/627,889

(22) Filed: Sep. 26, 2012

(65) Prior Publication Data

US 2013/0090078 A1      Apr. 11, 2013

(30) Foreign Application Priority Data

Oct. 7, 2011   (FR) ...................................... 11 03058

(51) Int. Cl.
*H04B 1/10*      (2006.01)
(52) U.S. Cl.
USPC .......... 455/296; 455/501; 455/63.1; 455/130; 455/226.1; 375/316; 375/346; 375/348
(58) Field of Classification Search
USPC .......... 455/501, 63.1, 130, 226.1, 296, 278.1; 375/316, 346, 348
See application file for complete search history.

(56) References Cited

U.S. PATENT DOCUMENTS

| 6,332,028 | B1 * | 12/2001 | Marash | ........................... 381/92 |
| 2004/0048574 | A1 * | 3/2004 | Walker et al. | ................ 455/63.1 |
| 2007/0015545 | A1 * | 1/2007 | Leifer et al. | ............... 455/562.1 |

OTHER PUBLICATIONS

Edalatzadeh et al.; A New Eigenspace Subband Beamformer for Cancellation of Broadband Interferences Using Subband Adaptive Filtering; International Symposium on Telecommunications; 2008; Department of Electrical Engineering; Iran University of Science and Technology; Tehran, Iran.
Brown et al.; Locating the Jammer Using A/J Software Receiver, ION GASS 1'7th International Technical Meeting of the Satellite Division; Sep. 21-24, 2004; Long Beach, California USA.
LeChaevalier et al.; STAP Developments in Thales; Proceedings of the 6th European Radar Conference; Sep. 30-Oct. 2, 2009; Rome, Italy.
Institut National De La Propriete Industrielle; Preliminary Report; May 15, 2012; Paris, France.

* cited by examiner

*Primary Examiner* — Tuan Pham
(74) *Attorney, Agent, or Firm* — Michael J. Donohue; Davis Wright Tremaine LLP

(57) ABSTRACT

A technique for locating sources interfering on a signal received by a receiver comprising an array of antennas calculates a spatio-temporal intercorrelation matrix $R_{xx}$, subdivides the useful band of the signals into sub-bands (b), and for each sub-band (b), calculates the spatial intercorrelation matrix R(b) associated with the sub-band (b) and calculates at least one of its eigenvalues $\{\lambda_1, \lambda_2, \ldots \lambda_M\}$. Interference in the sub-band is detected with the aid of the following detection criterion:

$$\log\left(\left(\sum_{m=k}^{M} \lambda_m\right)/(M-k+1)\right) - \log\left(\left(\prod_{m=k}^{M} \lambda_m\right)/(M-k+1)\right) > \text{threshold},$$

and determining the eigenvectors $\{U_1, U_2, \ldots U_N\}$ of the spatial intercorrelation matrix R(b), and determining the directions of arrival of the interfering sources by searching for the vectors of relative gains belonging to the said interference sub-space or which are orthogonal to the orthogonal noise sub-space and complementary to the interference sub-space.

26 Claims, 4 Drawing Sheets

METHOD AND SYSTEM FOR LOCATING INTERFERENCES BY FREQUENCY SUB-BAND

FIELD OF THE INVENTION

The present invention relates to the field of the locating of sources interfering on a signal received by a receiver comprising a plurality of receiving antennas or antenna array, for example a satellite radionavigation receiver or a digital communications receiver.

The subject of the invention is a method and a system for detecting and locating interfering sources by estimating their direction of arrival. It advantageously applies to receivers implementing spatio-temporal anti-interference processing of STAP (Space Time Adaptive Processing) type.

BACKGROUND OF THE INVENTION

Signal reception systems, for example satellite radionavigation or communication receivers, may be disturbed by interfering sources, intentional or unintentional, for example sources emitting a signal on a frequency close to that of the signal received or exhibiting harmonics around the frequency of this signal.

Consequently, the problem arises of the locating of these interfering sources so as to be able to deduce therefrom solutions making it possible to improve the processing operations allowing the removal of the undesirable effects of this interference on the receiver. In particular, the locating of interfering sources pertains to the determination of the number of sources, of their directions of arrival and of their frequency location in the useful band of the receiver.

The MUSIC algorithm, from the English "Multiple Signal Classification" known for locating emitters by detecting the emitted interference is known. This procedure is based on the determination of the eigenvalues and eigenvectors of the intercorrelation matrix of the signal received by the various antennas of the receiver and thus operates in the spatial domain. Its implementation is complex for processors with limited resources on account of the eigenvector decomposition of this matrix. Furthermore this procedure exhibits rather unreliable results for discriminating several interfering sources impacting the same signal.

The invention proposes an alternative procedure to those known, the complexity of implementation of which is decreased and which makes it possible to utilize an intercorrelation matrix in the spatial domain but also in the temporal domain to improve the precision of the estimations, notably when several interfering sources exist and to allow the frequency characterization of the interfering sources.

SUMMARY OF THE INVENTION

The subject of the invention is notably a method for locating sources interfering on a signal received by a receiver comprising an array of antennas, characterized in that it comprises the following steps:
  a step of calculating the spatio-temporal intercorrelation matrix $R_{xx}$ of the signals received by the elementary antennas of the said array,
  a step of subdividing the useful band of the said signals into sub-bands (b) and of generating a bandpass filter H(b) associated with each sub-band (b),
  for each sub-band (b),
  a step of calculating the spatial intercorrelation matrix R(b) associated with the sub-band (b) by applying the said filter H(b) to the spatio-temporal intercorrelation matrix $R_{xx}$,
  a step of calculating at least one eigenvalue $\{\lambda_1, \lambda_2, \ldots \lambda_m\}$ of the said spatial intercorrelation matrix R(b),
  a step of detecting interference, an interfering source being detected when an eigenvalue $\lambda_k$ satisfies the following detection criterion:

$$\log\left(\left(\sum_{m=k}^{M} \lambda_m\right)/(M-k+1)\right) - \log\left(\left(\prod_{m=k}^{M} \lambda_m\right)/(M-k+1)\right) > \text{threshold},$$

where M is the number of antennas of the said array, k is the index, varying from 1 to M, of the eigenvalues in descending order and threshold is a strictly positive predetermined detection threshold,
  a step of determining the set of eigenvectors $\{U_1, U_2, \ldots U_N\}$ corresponding to the eigenvalues $\{\lambda_1, \lambda_2, \ldots \lambda_N\}$ associated with a detected interfering source, the said set constituting a basis of the interference sub-space,
  a step of determining the directions of arrival of the interfering sources by searching for the vectors of relative gains belonging to the said interference sub-space or which are orthogonal to the orthogonal noise sub-space and complementary to the interference sub-space.

In a variant embodiment of the invention, the step of subdividing the useful band is carried out by dichotomy, a sub-band being subdivided if at least one interfering source is detected in this sub-band.

In a variant embodiment of the invention, the spatio-temporal intercorrelation matrix $R_{xx}$ is calculated block-wise with the help of the spatial intercorrelation matrices $R_l$ intercorrelating the multi-sensor signal received with the multi-sensor signal received and delayed by a number equal to l−1 of samples.

In a variant embodiment of the invention, the spatio-temporal intercorrelation matrix $R_{xx}$ is calculated with the aid of a systolic array.

In a variant embodiment of the invention, the said filters H(b) are generated with the help of frequency templates which do not exhibit any mutual overlap and in such a way that the set of templates occupies the whole of the useful band of the signal.

In a variant embodiment of the invention, the eigenvalues $\{\lambda_1, \lambda_2, \ldots \lambda_N\}$ are calculated with the help of the coefficients of the characteristic polynomial P(X) of the spatial intercorrelation matrix R(b) and of its successive polynomial divisions by $(X-\lambda_k)$.

In a variant embodiment of the invention, the said eigenvalues are calculated by applying Newton's iterative procedure to the said polynomial and polynomial divisions.

In a variant embodiment of the invention, the said detection criterion is calculated with the help of the first and of the penultimate coefficient of the said polynomial and polynomial divisions.

In a variant embodiment of the invention, the eigenvectors are calculated by the Gauss pivot procedure or by a Cholesky decomposition.

In a variant embodiment of the invention, the interference subset is defined by its projection matrix $P_{interference} = [U_1 \ldots U_k] \cdot [U_1 \ldots U_k]^{T*}$, the noise subset is defined by its projection matrix $P_{noise}$ equal to the difference between the identity matrix and the interference subset projection matrix and the step of determining the directions of arrival of the interfering sources is carried out by solving the equation $P_{noise} \cdot \vec{G}(\sigma,\alpha) = \vec{0}$ where $\vec{G}(\sigma,\alpha)$ is the vector of the relative gains of the antenna array in the direction defined by the angle $\sigma$ of elevation and the angle $\alpha$ of azimuth.

In a variant embodiment of the invention, the equation $P_{noise} \cdot \vec{G}(\sigma,\alpha) = \vec{0}$ is solved by searching for the values of $(\alpha,\sigma)$ which minimize the function $\Phi(\sigma,\alpha) = \|P_{noise} \cdot \vec{G}(\sigma,\alpha)\|^2$, where $\| \|$ is the modulus operator.

In a variant embodiment of the invention, the search for the minima of the function $\Phi(\sigma,\alpha)$ is carried out by applying the two-dimensional Newton procedure.

The subject of the invention is also a receiver comprising at least one antenna array intended to receive a signal, characterized in that it comprises means suitable for implementing the method for locating interfering sources according to the invention.

In a variant embodiment of the invention, the receiver furthermore comprises an anti-interference processing module suitable for removing the interference impacting the said signal and for calculating the said spatio-temporal intercorrelation matrix $R_{xx}$.

In a variant embodiment of the invention, the said signal is a radio-navigation signal or a telecommunication signal.

BRIEF DESCRIPTION OF THE DRAWINGS

Other characteristics and advantages of the invention will become apparent with the aid of the description which follows, offered in relation to appended drawings which represent.

MORE DETAILED DESCRIPTION

The method according to the invention is aimed at determining the number of interfering sources impacting a signal received by an array of antennas or sensors as well as their directions of arrival and their spectral location.

Figure 1A:
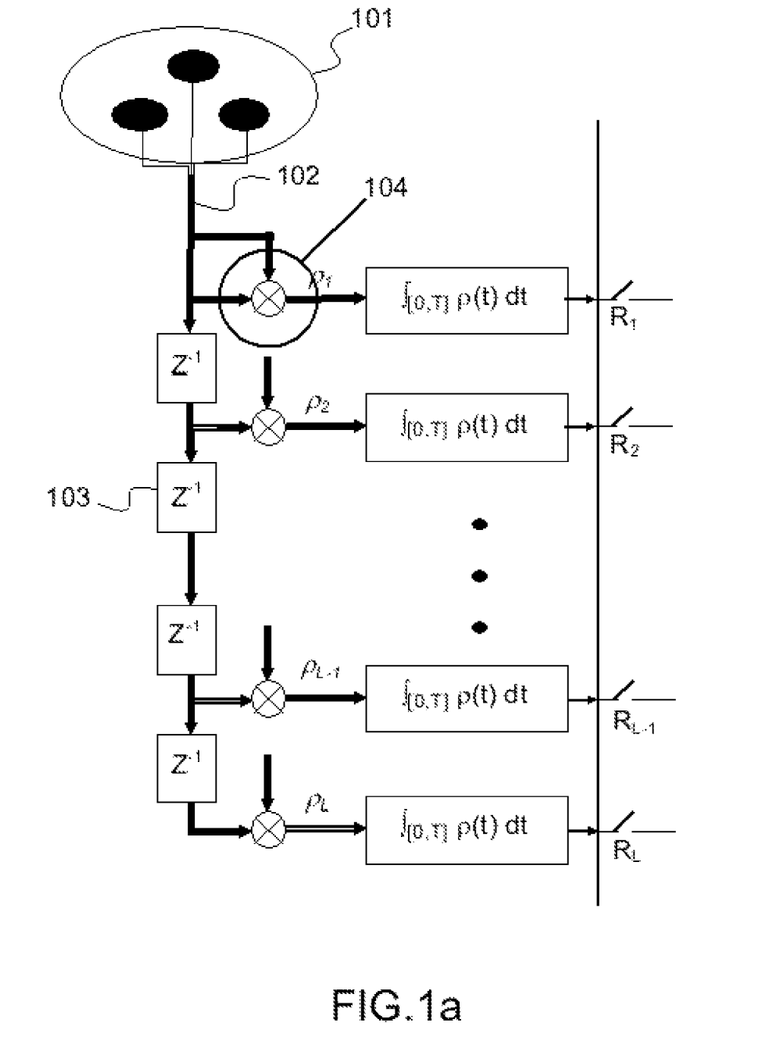
FIGS. 1a and 1b, two schematics showing diagrammatically the determination of the spatio-temporal intercorrelation matrix of the signal received by an antenna array constituting a receiver according to the invention, FIG. 2, a chart representing the possible shape of a template of a sub-band filter and the impulse response of this filter, FIG. 3, an illustration of Newton's iterative procedure for determining the eigenvalues of a spatial intercorrelation matrix, FIG. 4, a diagram of the direction of arrival of an interfering wave in a fixed frame with respect to the array of sensors constituting the receiver according to the invention, FIG. 5, a schematic of an exemplary receiver suitable for implementing the method according to the invention.

For this purpose, the first step of the method consists in determining the spatio-temporal intercorrelation matrix of the signal received. FIG. 1a shows diagrammatically the processing operations implemented by a receiver suitable for calculating this matrix.

Each sensor of an array of antennas 101 delivers a received signal. The sampled multi-sensor signal 102 is produced at the input of a delay line 103 composed of a number L of delays. A spatial correlation operator 104 is applied between the multi-sensor signal 102 and its delayed version so as to produce a number L of instantaneous intercorrelation matrices $\rho_l$. Each matrix $\rho_l$ is thereafter integrated over a given duration T to produce an intercorrelation matrix $R_l$ subsampled at a lower rate, so as to limit the influence of the noise and to decrease the rate of the processing operations implemented hereinafter in the method.

Advantageously, the instantaneous matrices $\rho_l$ are determined at a high processing frequency of the order of about ten MegaHertz. Their calculation can consequently be implemented on an integrated circuit. The sub-sampled matrices $R_l$ and the successive processing operations performed on these matrices are compatible with processors operating at a less fast rate and can thus be carried out by software means.

Figure 1B:
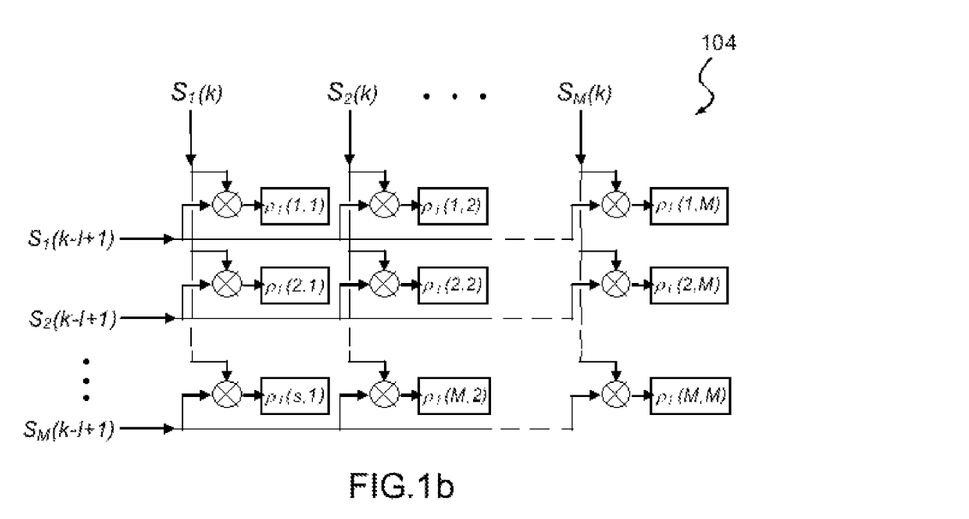

FIG. 1b shows diagrammatically in greater detail the spatial correlation operator 104 which carries out a correlation between the samples $S_1(k), S_2(k), \ldots S_M(k)$ of the signals received, at one and the same discrete instant k, by the M sensors of the array of antennas and the samples $S_1(k-l+1), S_2(k-l+1), \ldots, S_M(k-l+1)$ delayed by a number l of samples.

The matrices $R_l$ obtained ultimately are the spatial intercorrelation matrices for the correlation between the undelayed outputs of the M sensors and the outputs of the M sensors delayed by a number (l-1) of samples and are of dimensions (M,M).

A number M of sensors of between 4 and 7 makes it possible to ensure sufficient location performance while limiting the bulkiness of the array of antennas on the receiver. The number of delays L is limited by the calculational capacity of the processors executing the method according to the invention.

With the help of the spatial intercorrelation matrices $R_l$, the spatio-temporal intercorrelation matrix $R_{xx}$ is determined with the aid of the following relation:

$$R_{xx} = \begin{bmatrix} [R_1] & \ldots & [R_{l-1}^{*T}] & [R_l^{*T}] & [R_{l+1}^{*T}] & \ldots & [R_L^{*T}] \\ \vdots & & \vdots & \vdots & \vdots & & \vdots \\ [R_{l-1}] & \ldots & [R_1] & [R_2^{*T}] & [R_3^{*T}] & \ldots & [R_{L-l}^{*T}] \\ [R_l] & \ldots & [R_2] & [R_1] & [R_2^{*T}] & \ldots & [R_{L-l+1}^{*T}] \\ [R_{l+1}] & \ldots & [R_3] & [R_2] & [R_1] & \ldots & [R_{L-l+2}^{*T}] \\ \vdots & & \vdots & \vdots & \vdots & & \vdots \\ [R_L] & \ldots & [R_{L-l}] & [R_{L-l+1}] & [R_{L-l+1}] & \ldots & [R_1] \end{bmatrix}_{L.M \times L.M}$$

The spatio-temporal intercorrelation matrix $R_{xx}$ is of dimensions (L.M, L.M). It is a block Toeplitz matrix, that is to say its matrix coefficients are identical on each diagonal, and it is a symmetric matrix, in the Hermitian sense: $R_{xx}^T = R_{xx}^*$.

The spatial intercorrelation sub-matrix $R_1$ is also symmetric in the Hermitian sense $R_1^T = R_1^*$. By using the procedure described hereinabove, the matrix $R_{xx}$ is determined in a number of calculations which is proportional to $M^2 \times L$. Indeed, the calculation of the sub-matrices $R_l$ for l varying from 1 to L suffices to calculate all the coefficients of the matrix $R_{xx}$.

Other procedures are also conceivable, such as the use of a systolic array which produces the triangular matrix V, this being the square root of the matrix $R_{xx}$ which is equal to the product of V and of its complex conjugate $V^{T*}$. The number of calculations implemented by this procedure is, however, more significant, proportional to $M^2 \times L^2$.

Generally, any procedure making it possible to determine the spatio-temporal intercorrelation matrix $R_{xx}$ with the help of the signals received by the M sensors constituting the receiver remains compatible with the invention.

In the case where the receiver according to the invention implements, moreover, a spatio-temporal anti-interference processing STAP, the spatio-temporal intercorrelation matrix $R_{xx}$ is already calculated within the framework of this processing and may advantageously be reused. This particular feature will be recalled further on in the description.

A possible solution at this juncture is to apply the known MUSIC procedure directly to the spatio-temporal intercorrelation matrix $R_{xx}$. However, doing this exhibits several drawbacks. The decomposition of this matrix of dimensions (L.M, L.M) into eigenvalues and eigenvectors, prior to solving the problem, is complex on account of the significant size of the matrix. Moreover, as mentioned previously, the direct application of the MUSIC procedure to the spatio-temporal matrix $R_{xx}$ exhibits diminished performance when several interfering sources are emitting simultaneously in the useful frequency band of the receiver.

To remove these limitations, the invention consists notably in separating the useful band of the signal into one or more sub-bands and in reducing to a purely spatial problem by calculating a spatial intercorrelation matrix, of lower dimensions (M,M), associated with each sub-band.

Accordingly, a bandpass filter H(b) is designed, for each sub-band b, so as to calculate the spatial intercorrelation matrix R(b) associated with the sub-band b, with the help of the spatio-temporal intercorrelation matrix $R_{xx}$ with the aid of the following relation:

$R(b) = H(b)^{T*} \cdot R_{xx} \cdot H(b)$, where $^{T*}$ is the conjugate transpose operator.

The filter H(b) is a matrix filter of dimensions (L.M, M) which is expressed in the following form:

$$H(b) = \begin{bmatrix} h_1(b) \cdot Id \\ \vdots \\ h_l(b) \cdot Id \\ \vdots \\ h_L(b) \cdot Id \end{bmatrix}_{L.M \times M}$$

with $I_d$ the identity matrix of dimensions (M,M) and $h_l(b)$, for l varying from 1 to L, a vector filter with M coefficients.

The matrix R(b) is Hermitian. In the case where a systolic array is used to calculate the matrix $R_{xx}$, the calculation of R(b) may be carried out with the aid of the following relation:

$R(b) = H(b)^{T*} \cdot V \cdot V^{T*} \cdot H(b) = (H(b)^{T*} \cdot V) \cdot (H(b)^{T*} \cdot V)^{T*}$ The coefficients of each vector filter $h_l(b)$ may be calculated by carrying out the inverse transform of a predetermined filter template, and thereafter applying a windowing to reduce the effects of the number of matrix coefficients of the filter R(b) limited to L. For this purpose, the following relation may be used:

$$h_l(b) = \left[ \int_{\left[-\frac{F_e}{2}, \frac{F_e}{2}\right]} \exp\left(-j2\pi \frac{f}{F_e}\left(l - \frac{L}{2}\right)\right) \cdot template_b(f) \cdot df \right] \cdot \text{Window}(l - L/2) \quad (1)$$

with $F_e$ the signal sampling frequency, $template_b(f)$ the frequency template chosen for the filter and Window(l) corresponding to a windowing function.

Figure 2:
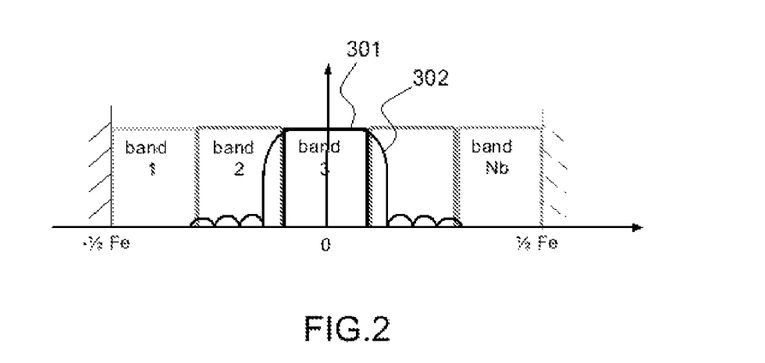

FIG. 2 represents, on a chart, the possible shape of the template 301 of a filter for a sub-band as compared with the frequency response 302 of the filter $h_l(b)$ determined ultimately with the aid of relation (1). The difference between the template 301 and the response 302 of the filter originates from the limited number of coefficients of the filter embodied in digital. The use of windowing makes it possible to limit the oscillations.

When several sub-bands are selected, the complex coefficients of the filter $H(b_2)$ associated with sub-band $b_2$ may be deduced from the coefficients of the filter $H(b_1)$ associated with sub-band $b_1$ by multiplying by a complex exponential with the aid of the following relation:

$$h_l(b_2) = h_l(b_1) \cdot \exp\left(-j2\pi \frac{F_{b2} - F_{b1}}{F_e}\left(l - \frac{L}{2}\right)\right),$$

with $F_{b1}$, $F_{b2}$ the central frequencies of the sub-bands b1, b2.

As represented in FIG. 2, the chosen template can consist of a frequency window. It can also take the form of any function suitable for this purpose. The templates chosen for each sub-band must together cover the whole of the useful frequency band of the signal so as not to ignore frequency zones in which an interfering source might be located. The chosen templates must not overlap so as to prevent an interfering source from being located frequentially in two adjacent bands, which would artificially increase the total number of interferences and therefore the difficulty in determining the directions of arrival of the sources. The minimum width of a sub-band is equal to $F_e/L$ and therefore the maximum number of sub-bands is equal to the number of delays L.

The number of sub-bands is a parameter of the method according to the invention. It may be chosen definitively or may evolve, in a dynamic manner, in the course of applying the method, as will be explained in greater detail subsequently.

The choice of the number of sub-bands results from a compromise between complexity of the processing operations implemented and degree of reliability of the results obtained. The method can also operate with a single sub-band, thereby exhibiting the advantage of decreasing the complexity of the calculations, a single spatial matrix being calculated.

A high number of sub-bands allows better precision in the detection of the number of interfering sources as well as estimation of their spectral occupancies. In particular, if the frequency spectrum of the interfering sources is narrow, a splitting into several sub-bands makes it possible to isolate each interfering source in a sub-band and thus to improve the results of the method. Conversely, if several sources interfere in the same sub-band, this being all the more probable the lower the number of sub-bands, the discrimination of the directions of arrival of each source is less precise.

The determination and the angular location of the interfering sources is thereafter performed in each predetermined sub-band.

Determination of the Number of Interfering Sources

Initially, the number of interfering sources in each sub-band is determined with the help of the application of the AIC criterion (Akaike Information Criterion) to the matrix R(b). This step of the method according to the invention is now described for application to a matrix R, it being understood that this step must be repeated for each matrix R(b) associated with each predefined sub-band.

Accordingly, the eigenvalues of the matrix R must be determined in descending order. Let $\{\lambda_1, \lambda_2, \ldots \lambda_M\}$ be the eigenvalues of the matrix R, sorted in descending order. If the following criterion is not complied with:

$$\log\left(\left(\sum_{m=1}^{M} \lambda_m\right)/M\right) - \log\left(\left(\prod_{m=1}^{M} \lambda_m\right)/M\right) > \text{threshold} \quad (2)$$

then the method culminates in the conclusion that no interfering source is detected in sub-band b. Indeed, when no interference impacts the signal received, all the eigenvalues of the intercorrelation matrix are substantially identical, since they are representative of the power of the thermal noise. In such a case, the two logarithmic quantities of relation (2) are substantially equal. However, it is reasonable to take account of the errors in estimating the matrix R, which may induce a dispersion in the measured eigenvalues, even if no interfering source exists. This is why the difference of the two logarithmic quantities is compared with a tolerance threshold which depends on the number of signal samples used for the calculation of the matrix R. In practice a threshold equal to log(1.2) makes it possible to tolerate an error of 20% in the ratio $(\Sigma \lambda_m/M)/(\Pi\lambda_m)^{1/m}$ compared with 1.

If criterion (2) is complied with, this signifies that at least the eigenvalue $\lambda_1$ is associated with an interfering source in sub-band b. The method must then be repeated for the following eigenvalue in descending order. For the eigenvalue $\lambda_2$ of rank 2, the criterion to be calculated, in a manner similar to relation (2), is:

$$\log\left(\left(\sum_{m=2}^{M} \lambda_m\right)/(M-1)\right) - \log\left(\left(\prod_{m=2}^{M} \lambda_m\right)/(M-1)\right) > \text{threshold} \quad (3)$$

If criterion (3) is not complied with, the method concludes the presence of a single interfering source associated with the eigenvalue $\lambda_1$. In the converse case, a second interfering source associated with the eigenvalue $\lambda_2$ is detected, and the process is repeated for the other eigenvalues until an eigenvalue $\lambda_k$ is found which does not satisfy the criterion or until the last eigenvalue:

$$\log\left(\left(\sum_{m=k}^{M} \lambda_m\right)/(M-k+1)\right) - \log\left(\left(\prod_{m=k}^{M} \lambda_m\right)/(M-k+1)\right) < \text{threshold}$$

with k between 1 and M

On completion of this step, the number of interfering sources detected in sub-band b is equal to k−1, the eigenvalues $\{\lambda_1, \lambda_2, \ldots, \lambda_{k-1}\}$ all satisfying the criterion for detecting an interfering source.

The direct determination of the set of eigenvalues of a matrix of dimensions (M,M) is an operation which is expensive to implement. To optimize the execution of the method according to the invention, it is desirable to proceed in the following manner.

Initially, the characteristic polynomial P(X) of the matrix R is calculated. This polynomial is of degree M:

$P(X) = \text{Determinant}(R - X \cdot Id)$ $P(X) = a_0 + a_1 \cdot X + a_2 \cdot X^2 + \ldots + a_{M-1} \cdot X^{M-1} + a_M \cdot X^M$ $P(X) = (\lambda_1 - X) \cdot (\lambda_2 - X) \ldots (\lambda_M - X)$ The values of the coefficients $a_M$, $a_{M-1}$ and $a_0$ are given by the following relations:

$a_M = (-1)^M$, $a_{M-1} = (-1)^{M-1} \cdot \text{Trace}(R)$ and
$a_0 = \text{Determinant}(R)$.

The remainder of the coefficients may be obtained by solving the following system of equations:

$P(m) = a_0 + m \cdot a_1 + m^2 \cdot a_2 + \ldots + m^{(M-1)} \cdot a_{M-1} + m^M \cdot a_M =$ $\text{Determinant}(R + m \cdot Id)$ $\vdots$ $P(2) = a_0 + 2 \cdot a_1 + 4 \cdot a_2 + \ldots + 2^{(M-1)} \cdot a_{M-1} + 2^M \cdot a_M =$ $\text{Determinant}(R - 2 \cdot Id)$ $P(1) = a_0 + a_1 + a_2 + \ldots + a_{M-1} + a_M = \text{Determinant}(R - Id)$ $P(0) = a_0 = \text{Determinant}(R)$ $P(-1) = a_0 - a_1 + a_2 - \ldots + a_{M-1} - a_M = \text{Determinant}(R + Id)$ $P(-2) = a_0 - 2 \cdot a_1 + 4 \cdot a_2 - \ldots + 2^{(M-1)} \cdot a_{M-1} - 2^M \cdot a_M =$ $\text{Determinant}(R + 2 \cdot Id)$ $\vdots$ $P(-m) = a_0 - m \cdot a_1 + m^2 \cdot a_2 - \ldots + m^{(M-1)} \cdot a_{M-1} - m^M \cdot a_M =$ $\text{Determinant}(R + m \cdot Id)$ Moreover the calculation of criterion (2) may be carried out with the help of the values of the coefficients $a_0$ and $a_{M-1}$ directly since $a_0$ is equal to the determinant of the matrix R, itself equal to the product of the eigenvalues, and $a_{M-1}$ is equal, in absolute value, to the trace of the matrix R, also equal to the sum of the eigenvalues which are all positive.

Figure 3:
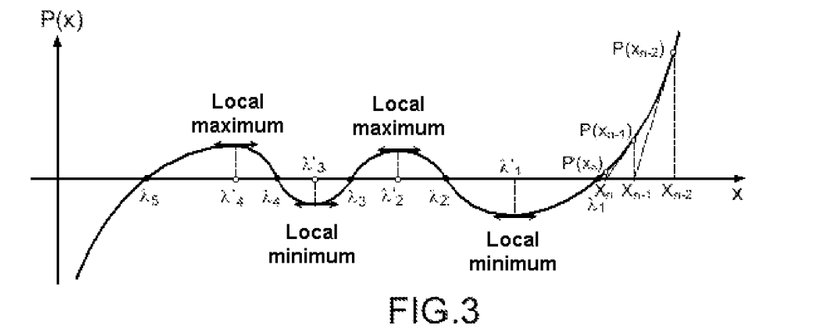

The roots of the characteristic polynomial P(X) are the eigenvalues of the matrix R. The highest eigenvalue $\lambda_1$ in descending order may be determined by applying Newton's iterative procedure which is illustrated in FIG. 3.

The following recurrent relation is defined: $X_{n+1} = P(x_n)/P'(x_n)$ with P' the polynomial derived from the polynomial P. This series converges to the eigenvalue $\lambda_1$ if the initial value $x_0$ of the series is greater than $\lambda_1$. To ensure this, $x_0$ may be fixed equal to the trace of the matrix R:

$x_0 = \text{Trace}(R) = (-1)^{M-1} \cdot a_{M-1} = |a_{M-1}|$

This iterative calculation is stopped when $|x_{n+1} - x_n|$ is less than a predetermined threshold, for example equal to a millionth of the value of the trace of the matrix R.

To calculate the second eigenvalue $\lambda_2$ in descending order, it suffices to perform the polynomial division of P(X) by $(\lambda_1 - X)$ so as to obtain a new polynomial Q(X) whose roots are the eigenvalues $\{\lambda_2, \ldots \lambda_M\}$ and to apply the aforementioned Newton procedure to it.

Furthermore, to calculate the AIC criterion applied to the second eigenvalue, in accordance with relation (2), the calculation of the product of the eigenvalues may be obtained directly through the value of the coefficient $b_0$ of lowest degree or first coefficient of the polynomial Q(X) and the sum of the eigenvalues may be obtained directly through the absolute value of the coefficient $b_{M-2}$ of degree M−2 or penultimate coefficient of the polynomial Q(X).

Thus, it is not entirely necessary to determine the set of eigenvalues of the matrix R from the outset. The AIC criterion is tested for each eigenvalue determined in descending order until an eigenvalue $\lambda_k$ is found which does not comply with this criterion. It is therefore not necessary to calculate the following eigenvalues $\lambda_k, \ldots, \lambda_M$ in this case. The number of detected interference sources will then be N=k−1.

Adaptive Splitting into Sub-Bands

As mentioned previously, the number of frequency sub-bands may be predefined before the implementation of the method in a static manner. It can also be determined in a dynamic manner by dichotomy, as a function of the interfering sources detected.

For this purpose, the number of sub-bands is initialized to a single sub-band covering the whole of the sampled frequency domain [−$F_e$/2; $F_e$/2]. The criterion defined by relation (2) is applied to this single sub-band. If this criterion is complied with, that is to say there is no overstepping of the detection threshold, it is considered that there is no interference in the useful band of the signal and the method is stopped.

In the converse case, when there is overstepping of the detection threshold, this signifies that at least one interfering source is present in the useful band of the signal, the band [−$F_e$/2; $F_e$/2] is then split into a plurality of sub-bands, for example two sub-bands, of identical widths. The criterion (2) is applied to each sub-band and the process is repeated for each sub-band in which interference is detected. The splitting into sub-bands is interrupted when the frequency width of the narrowest sub-band is sufficiently fine to obtain precise frequency location of the interfering source or at the latest when the width of the narrowest sub-band is less than or equal to $F_e$/L.

Determination of the Directions of Arrival of the Interfering Sources

Once the number N of interfering sources and the associated eigenvalues for each sub-band have been determined, the method according to the invention consists in calculating, for each eigenvalue $\lambda_i$ retained, the corresponding eigenvectors. For this purpose, a possible procedure consists in solving the following system of equations:

$$\{R(b) - \lambda_i Id\} \cdot X = 0$$

$$\text{with } R(b) = \begin{bmatrix} r_{1,1} & \cdots & r_{1,m} & \cdots & r_{1,M} \\ \vdots & & \vdots & & \vdots \\ r_{m,1} & \cdots & r_{m,n} & \cdots & r_{m,M} \\ \vdots & & \vdots & & \vdots \\ r_{M,1} & \cdots & r_{M,m} & \cdots & r_{M,M} \end{bmatrix}_{M \times M}$$

$$X = \begin{bmatrix} x_1 \\ x_2 \\ \vdots \\ x_{M-1} \\ x_M \end{bmatrix}_{M \times 1},$$

Id is the identity matrix in the space $C^M$ of the complex matrices of dimensions (M,M)

By assuming the last component of the eigenvector to be nonzero and equal to 1, and by ignoring the last row, a system reduced to M−1 equations and M−1 unknowns is obtained which may be solved by the Gauss pivot procedure at the price of a number of complex operations of the order of $(M-1)^3$. It can also be solved by way of a Cholesky decomposition, the reduced matrix $R(b)-\lambda_i \cdot Id$, that is to say without the last row or the last column being symmetric. In this case the number of complex operations is halved. In the case where the last component of the eigenvector is zero, another component is fixed at zero. Once the solution is found, it is normalized to obtain the eigenvector $U_i$ associated with the eigenvalue $\lambda_i$. Any known procedure making it possible to calculate the eigenvectors of a matrix is equivalent.

The set of normalized eigenvectors $(U_1, \ldots, U_N)$ of the matrix R(b) corresponding to the N eigenvalues associated with the detected interfering sources constitutes an orthogonal basis of the interference sub-space of the vector space $C^M$, where C is the set of complex numbers. The projection matrix for this sub-space is defined by the following relation:

$$P_{interference} = [U_1 \ldots U_N] \cdot [U_1 \ldots U_N]^{T*},$$

where $^{T*}$ is the conjugate transpose operator.

The noise sub-space is orthogonal and complementary to the interference sub-space. Its projection matrix is therefore equal to:

$$P_{noise} = I_d - P_{interference},$$

where $I_d$ is the identity matrix in the space $C^M$.

An objective of the invention is to determine the direction of arrival of an interfering wave so as to locate its source.

Figure 4:
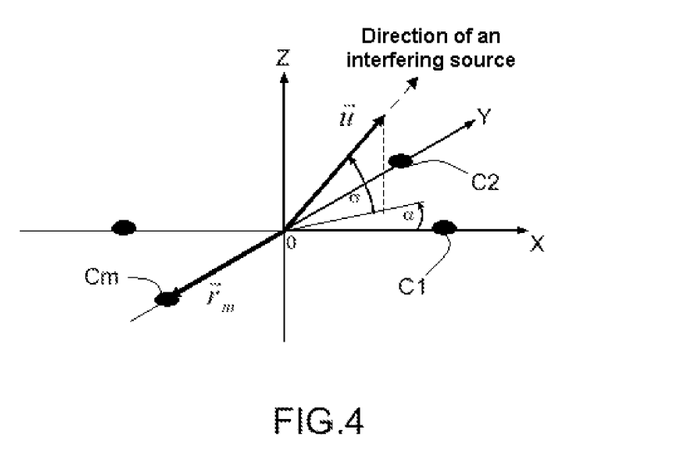

FIG. 4 represents the direction of arrival of an interfering wave, demarcated by its direction vector $\vec{u}(\sigma, \alpha)$ expressed in a sensor frame fixed with respect to the directions of pointing of at least two sensors of the array constituting the receiver. In FIG. 4, the sensors C1 and C2 define the directions X and Y of the frame, the direction Z being orthogonal to the plane (X,Y). The angle $\alpha$ between the direction of pointing of the first sensor C1 and the direction of arrival of the interfering wave projected onto the plane (X,Y) is the angle of azimuth. The angle $\sigma$ between the plane (X,Y) and the direction of arrival of the interfering wave is the angle of elevation.

The vector of the relative gains of antennas on the sensors $C_1, \ldots, C_m, \ldots C_M$ of the array of antennas in the spatial direction $(\sigma, \alpha)$ is defined by:

$$\vec{G}(\sigma, \alpha) = \begin{bmatrix} g_1 \\ \vdots \\ g_m \\ \vdots \\ g_M \end{bmatrix}_{M \times 1}$$

$$g_m = \exp(2j\pi \cdot \vec{u}(\sigma, \alpha) \cdot \vec{r}_{sensors\ m} / \lambda) + \beta_{0\ sensor\ m}(\sigma, \alpha)$$

$$\vec{u}(\sigma, \alpha) = \begin{bmatrix} \cos(\sigma) \cdot \cos(\alpha) \\ \cos(\sigma) \cdot \sin(\alpha) \\ \sin(\sigma) \end{bmatrix}_{3 \times 1}$$

is the direction vector in the spatial direction $(\sigma, \alpha)$, expressed in the sensor frame (X,Y,Z)

$$\vec{r}_{sensors\ m} = \begin{bmatrix} X_{sensor\ m} \\ Y_{sensor\ m} \\ Z_{sensor\ m} \end{bmatrix}_{3 \times 1}$$

is the position vector of sensor $C_m$, expressed in the sensor frame (X,Y,Z)

$\beta_{0\ sensor\ m}(\sigma, \alpha)$ is the complex gain, with an amplitude and a phase, of sensor $C_m$, taken in isolation, in the spatial direction $(\sigma, \alpha)$, given by a priori knowledge of the radiation pattern of sensor $C_m$.

Moreover, the interference sub-space is also generated by the vectors of relative gains $\vec{G}(\sigma_i, \alpha_i)$ associated with the spatial directions $(\alpha_i,\sigma_i)$ of the detected sources of interference, the index i varying from 1 to N.

The following step of the method according to the invention consists in determining all the vectors of relative gains $\vec{G}(\sigma,\alpha)$ belonging to the interference sub-space and which therefore correspond to a direction $(\alpha_i,\sigma_i)$ of a source of interference.

To verify whether a vector of relative gains belongs to the interference sub-space, it suffices to project this vector into the orthogonal and complementary noise sub-space. If the result is the zero vector then the vector does indeed belong to the interference sub-space.

This is conveyed by the following relation:

$$P_{noise} \cdot \vec{G}(\sigma,\alpha) = \vec{0} \quad (4)$$

which is satisfied for any spatial direction $(\alpha_i,\sigma_i)$ corresponding to an interfering source.

Relation (4) may be solved practically by searching for the values of $(\alpha,\sigma)$ for which the modulus of the projected vector: $\Phi(\sigma,\alpha) = \|P_{noise} \cdot \vec{G}(\sigma,\alpha)\|^2$ is zero. $\Phi(\sigma,\alpha) = \vec{G}(\sigma,\alpha)^{T*} \cdot P_{noise} \cdot P_{noise} \cdot \vec{G}(\sigma,\alpha)^{T*} \cdot P_{noise} \cdot \vec{G}(\sigma,\alpha)$, $P_{noise}^2 = P_{noise}$ since $P_{noise}$ is a projection matrix.

To determine the values for which the function $\Phi(\sigma,\alpha)$ is zero, it may be advantageous to proceed in an iterative manner by using, for example, the two-dimensional Newton procedure consisting in calculating the following relation until convergence to a pair of stable values of $(\alpha,\sigma)$:

$$\begin{bmatrix} \sigma_{n+1} \\ \alpha_{n+1} \end{bmatrix} = \begin{bmatrix} \sigma_n \\ \alpha_n \end{bmatrix} - \Phi(\sigma_n,\alpha_n) \cdot \frac{\vec{g}\text{rad}\Phi(\sigma_n,\alpha_n)}{\|\vec{g}\text{rad}\Phi(\sigma_n,\alpha_n)\|^2},$$

$$\text{with } \vec{g}\text{rad}\Phi(\sigma,\alpha) = \begin{bmatrix} \frac{\partial \Phi}{\partial \sigma}(\sigma,\alpha) \\ \frac{\partial \Phi}{\partial \alpha}(\sigma,\alpha) \end{bmatrix}$$

For each interference source to be searched for, the aforementioned relation must be initialized with a different search direction $(\alpha,\sigma)$, for example taken equal to one of the 3 axes of the frame (X,Y,Z) when the number of sources detected is equal to 3.

The calculation is stopped when $|\Phi(\sigma_{n+1},\alpha_{n+1}) - \Phi(\sigma_n,\alpha_n)|$ is less than a predefined convergence threshold.

The calculation of the gradient of the function $\Phi(\sigma,\alpha)$ may be obtained with the aid of the following relations:

$$\frac{\partial \Phi}{\partial \sigma}(\sigma,\alpha) = 2 \cdot \vec{G}(\sigma,\alpha)^{T*} \cdot P_{noise} \cdot \frac{\partial \vec{G}}{\partial \sigma}(\sigma,\alpha)$$

$$\frac{\partial \Phi}{\partial \alpha}(\sigma,\alpha) = 2 \cdot \vec{G}(\sigma,\alpha)^{T*} \cdot P_{noise} \cdot \frac{\partial \vec{G}}{\partial \alpha}(\sigma,\alpha)$$

$$\frac{\partial g_m}{\partial \sigma}(\sigma,\alpha) =$$

$$\left(2j\pi \cdot \frac{\partial \vec{u}}{\partial \sigma}(\sigma,\alpha) \cdot \vec{r}_{sensors\,m}/\lambda\right) \cdot \exp(2j\pi \cdot \vec{u}(\sigma,\alpha) \cdot \vec{r}_{sensors\,m}/\lambda) +$$

$$\frac{\partial \beta_{0\,sensors\,m}}{\partial \sigma}(\sigma,\alpha)$$

-continued $$\frac{\partial g_m}{\partial \alpha}(\sigma,\alpha) = \left(2j\pi \cdot \frac{\partial \vec{u}}{\partial \alpha}(\sigma,\alpha) \cdot \vec{r}_{sensors\,m}/\lambda\right) \cdot$$

$$\exp(2j\pi \cdot \vec{u}(\sigma,\alpha) \cdot \vec{r}_{sensors\,m}/\lambda) + \frac{\partial \beta_{0\,sensor\,m}}{\partial \alpha}(\sigma,\alpha)$$

$$\frac{\partial \vec{u}}{\partial \sigma}(\sigma,\alpha) = \begin{bmatrix} -\sin(\sigma) \cdot \cos(\alpha) \\ -\sin(\sigma) \cdot \sin(\alpha) \\ \cos(\sigma) \end{bmatrix}$$

$$\frac{\partial \vec{u}}{\partial \alpha}(\sigma,\alpha) = \begin{bmatrix} -\cos(\sigma) \cdot \sin(\alpha) \\ \cos(\sigma) \cdot \cos(\alpha) \\ 0 \end{bmatrix}$$

The gradient can also be approximated by applying a finite difference procedure consisting in estimating the value of the gradient by using two close points $(\alpha,\sigma)$ and $(\alpha+d\alpha,\sigma+d\sigma)$.

$$\vec{g}\text{rad}\Phi(\sigma,\alpha) = \begin{bmatrix} [\Phi(\sigma+d\sigma,\alpha) - \Phi(\sigma,\alpha)]/d\sigma \\ [\Phi(\sigma,\alpha+d\alpha) - \Phi(\sigma,\alpha)]/d\alpha \end{bmatrix}$$

To improve the precision of the results obtained, it is possible to express the direction of arrival of the interfering wave in a frame tied to the Earth rather than in a frame tied to the sensor. This change of frame may be obtained with the aid of a, for example inertial, attitude measurement. The directions of arrival calculated in a fixed terrestrial frame can thereafter be filtered or averaged to refine the precision of the measurements by eliminating the noise without being constrained by the motions of the carrier of the device when the latter is mobile.

Figure 5:
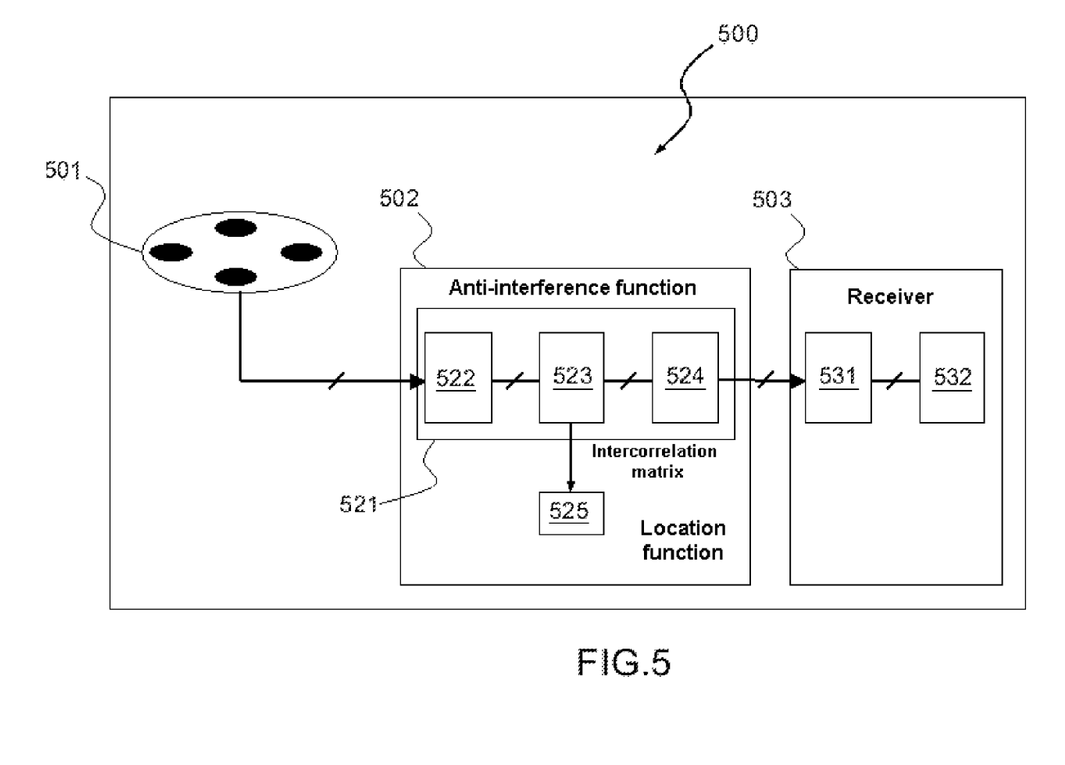

FIG. 5 represents, in a diagram, an example of a receiver suitable for implementing the method according to the invention.

The receiver 500 may be for example a communication receiver or a radio-navigation receiver. It comprises an antenna array or sensor array 501 intended to receive a signal, an antenna processing module 502 and a signal reception module 503. The antenna processing module 502 comprises at least one anti-interference processing module 521 suitable for carrying out a spatial SAP or spatio-temporal STAP signal processing function so as to eliminate the impact of the interference in the signal received before the latter is transmitted to the reception module 503. The anti-interference processing module 521 comprises at least one first card 522 for transposition to low frequency and digitization, a second digital card 523 carrying out the signal processing function suitable for removing the influence of the interference and a third card 524 for transposition to high frequency. The reception module 503 itself comprises a first card 531 for transposition to low frequency and digitization and a second digital card 532 suitable for executing a signal processing function on the signal received, for example a function for demodulating the signal or a function for processing a radio-navigation signal able to determine the position of the receiver 500. The anti-interference processing module 521 furthermore comprises a module 525 for locating interfering sources executing the method according to the invention. This module 525 receives, from the digital processing card 523, the spatio-temporal intercorrelation matrix $R_{xx}$ of the signals received on the array of antennas 501 and is parametrized by external means providing it with information about the geometry and the characteristics of the array of antennas, notably the gain and phase diagrams of the antennas, as well as the spatial and/or frequency search spans and optionally the number of interfering sources to be located. The module for locating interference 525 delivers as output the directions of arrival, in terms of azimuth and elevation, of the interfering waves as well as their frequency occupancy and their number.

In the case where the receiver 500 does not comprise any anti-interference processing module 521, the spatio-temporal intercorrelation matrix $R_{xx}$ is calculated directly by the module for locating interference 525 according to the invention.

The invention claimed is:

1. Method for locating sources interfering on a signal received by a receiver comprising an array of antennas, said method comprising the following steps:
   a step of calculating the spatio-temporal intercorrelation matrix $R_{xx}$ of the signals received by the elementary antennas of the said array, a step of subdividing the useful band of the said signals into sub-bands (b) and of generating a bandpass filter H(b) associated with each sub-band (b),
   for each sub-band (b),
   a step of calculating the spatial intercorrelation matrix R(b) associated with the sub-band (b) by applying the said filter H(b) to the spatio-temporal intercorrelation matrix $R_{xx}$,
   a step of calculating at least one eigenvalue $\{\lambda_1, \lambda_2, \ldots \lambda_M\}$ of the said spatial intercorrelation matrix R(b),
   a step of detecting interference, an interfering source being detected when an eigenvalue $\lambda_k$ satisfies the following detection criterion:

$$\log\left(\left(\sum_{m=k}^{M}\lambda_m\right)/(M-k+1)\right) - \log\left(\left(\prod_{m=k}^{M}\lambda_m\right)/(M-k+1)\right) > \text{threshold},$$

where M is the number of antennas of the said array, k is the index, varying from 1 to M, of the eigenvalues in descending order and threshold is a strictly positive predetermined detection threshold,
   a step of determining the set of eigenvectors $\{U_1, U_2, \ldots U_N\}$ corresponding to the eigenvalues $\{\lambda_1, \lambda_2, \ldots \lambda_N\}$ associated with a detected interfering source, the said set constituting a basis of the interference subspace,
   a step of determining the directions of arrival of the interfering sources by searching for the vectors of relative gains belonging to the said interference subspace or which are orthogonal to the orthogonal noise sub-space and complementary to the interference sub-space.

2. Method according to claim 1, wherein the step of subdividing the useful band is carried out by dichotomy, a sub-band being subdivided if at least one interfering source is detected in this sub-band.

3. Method according to claim 1, wherein the spatio-temporal intercorrelation matrix $R_{xx}$ is calculated block-wise with the help of the spatial intercorrelation matrices $R_l$ intercorrelating the multi-sensor signal received with the multi-sensor signal received and delayed by a number equal to l−1 of samples.

4. Method according to claim 1, wherein the spatio-temporal intercorrelation matrix $R_{xx}$ is calculated with the aid of a systolic array.

5. Method according to claim 1, wherein the said filters H(b) are generated with the help of frequency templates which do not exhibit any mutual overlap and in such a way that the set of templates occupies the whole of the useful band of the signal.

6. Method according to claim 1, wherein the eigenvalues $\{\lambda_1, \lambda_2, \ldots \lambda_N\}$ are calculated with the help of the coefficients of the characteristic polynomial P(X) of the spatial intercorrelation matrix R(b) and of its successive polynomial divisions by $(X-\lambda_k)$.

7. Method according to claim 6, wherein the said eigenvalues are calculated by applying Newton's iterative procedure to the said polynomial and polynomial divisions.

8. Method according to claim 6, wherein the said detection criterion is calculated with the help of the first and of the penultimate coefficient of the said polynomial and polynomial divisions.

9. Method according to claim 1, wherein the eigenvectors are calculated by the Gauss pivot procedure or by a Cholesky decomposition.

10. Method according to claim 1, wherein an interference subset is defined by its projection matrix $P_{interference}=[U_1 \ldots U_k]\cdot[U_1 \ldots U_k]^{T*}$, the noise subset is defined by its projection matrix $P_{noise}$ equal to the difference between the identity matrix and the interference subset projection matrix and the step of determining the directions of arrival of the interfering sources is carried out by solving the equation $P_{noise}\cdot\vec{G}(\sigma,\alpha)=\vec{0}$ where $\vec{G}(\sigma,\alpha)$ is the vector of the relative gains of the antenna array in the direction defined by the angle σ of elevation and the angle α of azimuth.

11. Method according to claim 10, wherein the equation $P_{noise}\cdot\vec{G}(\sigma,\alpha)=\vec{0}$ is solved by searching for the values of (α,σ) which minimize the function $\Phi(\sigma,\alpha)=\|P_{noise}\cdot\vec{G}(\sigma,\alpha)\|^2$, where $\|\ \|$ is the modulus operator.

12. Method according to claim 11, wherein the search for the minima of the function $\Phi(\sigma,\alpha)$ is carried out by applying the two-dimensional Newton procedure.

13. Receiver comprising at least one antenna array intended to receive a signal, said receiver comprising:
   means for calculating the spatio-temporal intercorrelation matrix $R_{xx}$ of the signals received by the elementary antennas of the said array;
   means for subdividing the useful band of the said signals into sub-bands (b) and for generating a bandpass filter H(b) associated with each sub-band (b):
   for each sub-band (b),
   means for calculating the spatial intercorrelation matrix R(b) associated with the sub-band (b) by applying the said filter H(b) to the spatio-temporal intercorrelation matrix $R_{xx}$;
   means for calculating at least one eigenvalue $\{\lambda_1, \lambda_2, \ldots \lambda M\}$ of the said spatial intercorrelation matrix R(b);
   means for detecting interference, an interfering source being detected when an eigenvalue $\lambda_k$ satisfies the following detection criterion:

$$\log\left(\left(\sum_{m=k}^{M}\lambda_m\right)/(M-k+1)\right) - \log\left(\left(\prod_{m=k}^{M}\lambda_m\right)/(M-k+1)\right) > \text{threshold},$$

where M is the number of antennas of the said array, k is the index, varying from 1 to M, of the eigenvalues in descending order and threshold is a strictly positive predetermined detection threshold;

means for determining a set of eigenvectors $\{U_1, U_2, \ldots U_N\}$ corresponding to the eigenvalues $\{\lambda_1, \lambda_2, \ldots \lambda_N\}$ associated with a detected interfering source, the said set constituting a basis of the interference sub-space; and means for determining the directions of arrival of the interfering sources by searching for the vectors of relative gains belonging to the said interference sub-space or which are orthogonal to the orthogonal noise sub-space and complementary to the interference sub-space.

14. Receiver according to claim 13, further comprising an anti-interference processing module suitable for removing the interference impacting the said signal and the means for calculating the said spatio-temporal intercorrelation matrix $R_{xx}$.

15. Receiver according to claim 13, wherein the said signal is a radio-navigation signal or a telecommunication signal.

16. Receiver according to claim 13, wherein the means for subdividing the useful band is carried out by dichotomy, a sub-band being subdivided if at least one interfering source is detected in this sub-band.

17. Receiver according to claim 13, wherein the means for calculating the spatio-temporal intercorrelation matrix $R_{xx}$ calculates the spatio-temporal intercorrelation matrix $R_{xx}$ block-wise with the help of the spatial intercorrelation matrices $R_l$ intercorrelating the multi-sensor signal received with the multi-sensor signal received and delayed by a number equal to l–1 of samples.

18. Receiver according to claim 13, wherein the means for calculating the spatio-temporal intercorrelation matrix $R_{xx}$ calculates the spatio-temporal intercorrelation matrix $R_{xx}$ with the aid of a systolic array.

19. Receiver according to claim 13, wherein the means for generating said filters H(b) generate said filters H(b) with the help of frequency templates which do not exhibit any mutual overlap and in such a way that the set of templates occupies the whole of the useful band of the signal.

20. Receiver according to claim 13, wherein the means for calculating the eigenvalues $\{\lambda_1, \lambda_2, \ldots \lambda_N\}$ calculate the eigenvalues $\{\lambda_1, \lambda_2, \ldots \lambda_N\}$ with the help of the coefficients of the characteristic polynomial P(X) of the spatial intercorrelation matrix R(b) and of its successive polynomial divisions by $(\lambda - \lambda_k)$.

21. Receiver according to claim 20, wherein the means for calculating the eigenvalues $\{\lambda_1, \lambda_2, \ldots \lambda_N\}$ calculate the eigenvalues $\{\lambda_1, \lambda_2, \ldots \lambda_N\}$ by applying Newton's iterative procedure to the said polynomial and polynomial divisions.

22. Receiver according to claim 20, wherein the means for detecting interference calculates said detection criterion with the help of the first and of the penultimate coefficient of the said polynomial and polynomial divisions.

23. Receiver according to claim 13, wherein the means for determining the set of eigenvectors determines the set of eigenvectors calculates the set of eigenvectors by the Gauss pivot procedure or by a Cholesky decomposition.

24. Receiver according to claim 13, wherein the means for determining the set of eigenvectors determines an interference subset that is defined by its projection matrix $P_{interference}=[U_1 \ldots U_k]\cdot[U_1 \ldots U_k]^{T*}$, the noise subset is defined by its projection matrix $P_{noise}$ equal to the difference between the identity matrix and the interference subset projection matrix and the step of determining the directions of arrival of the interfering sources is carried out by solving the equation $P_{noise}\cdot\vec{G}(\sigma,\alpha)=\vec{0}$ where $\vec{G}(\sigma,\alpha)$ is the vector of the relative gains of the antenna array in the direction defined by the angle $\sigma$ of elevation and the angle $\alpha$ of azimuth.

25. Receiver according to claim 24, wherein the means for determining the set of eigenvectors solves the equation $P_{noise}\cdot\vec{G}(\sigma,\alpha)=\vec{0}$ by searching for the values of $(\alpha,\sigma)$ which minimize the function $\Phi(\sigma,\alpha)=\|P_{noise}\cdot\vec{G}(\sigma,\alpha)\|^2$, where $\|\ \|$ is the modulus operator.

26. Receiver according to claim 25, wherein the means for determining the set of eigenvectors carries out the search for the minima of the function $\Phi(\sigma,\alpha)$ by applying the two-dimensional Newton procedure.

\* \* \* \* \*